United States Patent
Kim

(10) Patent No.: US 7,220,610 B2
(45) Date of Patent: May 22, 2007

(54) MANUFACTURING METHOD OF ARRAY SUBSTRATE FOR LIQUID CRYSTAL DISPLAY DEVICE

(75) Inventor: Hyun-Bae Kim, Dacjcon (KR)

(73) Assignee: LG. Philips LCD Co., Ltd., Seoul (KR)

( * ) Notice: Subject to any disclaimer, the term of this patent is extended or adjusted under 35 U.S.C. 154(b) by 23 days.

(21) Appl. No.: 10/880,099

(22) Filed: Jun. 30, 2004

(65) Prior Publication Data

US 2005/0142678 A1    Jun. 30, 2005

(30) Foreign Application Priority Data

Dec. 30, 2003    (KR) .................... 10-2003-0099988

(51) Int. Cl.
*H01L 21/00* (2006.01)
(52) U.S. Cl. ........................ 438/30; 438/22; 438/48; 257/59; 257/72
(58) Field of Classification Search .............. 438/30, 438/22, 48; 257/59, 72
See application file for complete search history.

(56) References Cited

U.S. PATENT DOCUMENTS

| | | | |
|---|---|---|---|
| 6,801,279 B2* | 10/2004 | Jang et al. ................. | 349/113 |
| 2004/0125288 A1* | 7/2004 | Jeong et al. ................ | 349/113 |
| 2004/0207784 A1* | 10/2004 | Lim et al. ................... | 349/114 |

* cited by examiner

*Primary Examiner*—Dung A. Le
(74) *Attorney, Agent, or Firm*—McKenna Long & Aldridge LLP

(57) ABSTRACT

A manufacturing method of an array substrate for a liquid crystal display device includes forming a switching element in a pixel area on a substrate, wherein the pixel area includes a reflective area and a transmissive area, forming an organic layer on an entire surface of the substrate including the switching element, first exposing the organic layer using a first mask, second exposing the first exposed organic layer using a second mask, developing the first and second exposed organic layer to form a passivation layer having an unevenness pattern in the reflective area, forming a reflector on the passivation layer in the reflective area, and forming a pixel electrode on the reflector in the reflective area and the transmissive area.

19 Claims, 14 Drawing Sheets

MANUFACTURING METHOD OF ARRAY SUBSTRATE FOR LIQUID CRYSTAL DISPLAY DEVICE

This application claims the benefit of Korean Patent Application No. 2003-0099988, filed on Dec. 30, 2003, which is hereby incorporated by reference for all purposes as if fully set forth herein.

BACKGROUND OF THE INVENTION

1. Field of the Invention

The present invention relates to a liquid crystal display (LCD) device and more particularly, to a manufacturing method of an array substrate for a liquid crystal display (LCD) device including a reflector.

2. Discussion of the Related Art

Due to the rapid development in information technology, display devices have evolved into instruments that can process and display a great deal of information. Flat panel display (FPD) devices, which have the properties of a thin profile, low weight and low power consumption, have been developed.

The FPD devices may be classified into two types depending on whether the device emits or reflects/transmits light. One type is a light-emitting type display device that emits light to display images, and the other type is a light-reflecting/transmitting type display device that uses an external light source to display images. Plasma display panels (PDPs), field emission display (FED) devices, and electroluminescent (EL) devices are examples of the light-emitting type display devices. Liquid crystal display (LCD) devices are examples of the light-reflecting/transmitting type display device.

Among many kinds of FPD devices, LCD devices are widely used for notebook computers and desktop monitors because of their excellent characteristics of resolution, color display and display quality.

In general, a liquid crystal display (LCD) device includes two substrates, which are spaced apart and facing each other, and a liquid crystal layer interposed between the two substrates. Each of the substrates includes an electrode and the electrodes of each substrate are also facing each other. Voltage is applied to each electrode and an electric field is induced between the electrodes. An arrangement of the liquid crystal molecules is changed by varying the intensity of the electric field. The LCD device displays a picture by varying the light intensity according to the arrangement of the liquid crystal molecules.

Because the LCD device is not luminescent, it needs an additional light source in order to display images.

Therefore, a backlight is arranged behind a liquid crystal panel and is used as a light source. Light incident from the backlight penetrates the liquid crystal panel, and the amount of light transmitted is controlled depending on the arrangement of the liquid crystal molecules. Here, the substrates are usually transparent and the electrodes of each substrate are usually formed of a transparent conductive material.

This LCD device is referred to as a transmissive type LCD device or a transmissive LCD device. Because the transmissive LCD device uses the backlight as a light source, it can display a bright image in dark surroundings. However, the transmissive LCD device has high power consumption due to the operation of the backlight.

To remedy this disadvantage, a reflective (or reflection type) LCD device is suggested. The reflective LCD device displays images by reflecting external light, thereby resulting in low power consumption as compared with the transmissive LCD device. In the reflective LCD device, a pixel electrode on a lower array substrate is made of a conductive material having high reflectance and a common electrode on an upper color filter substrate is made of a transparent conductive material so that external light can be transmitted therethrough.

However, the reflective LCD device cannot be used in dark surroundings because it depends on an external light source.

To solve the above problems, a transflective LCD device has been recently proposed and developed. The transflective LCD device can be used both in a transmissive mode and in a reflective mode. A related art transflective LCD device will be described hereinafter more in detail.

FIG. 1 is a cross-sectional view of an array substrate for a related art transflective LCD device. As shown in FIG. 1, a reflective area RtA and a transmissive area TmA, which together constitute a pixel area, are defined on a substrate 3.

In the reflective area RtA, a gate electrode 9 is formed on the substrate 3. Although not shown in the figure, a gate line and a storage electrode are also formed in the same layer as the gate electrode 9. A gate insulating layer 15 is formed on an entire surface of the substrate 3 including the gate electrode 9. A semiconductor layer 18 is formed on the gate insulating layer 15 corresponding to the gate electrode 9. The semiconductor layer 18 includes an active layer 18a and an ohmic contact layer 18b.

A source electrode 21 and a drain electrode 24 are formed over the semiconductor layer 18. The source electrode 21 and the drain electrode 24 contact the ohmic contact layer 18b of the semiconductor layer 18. The source electrode 21 and the drain electrode 24 are spaced from and facing each other. The gate electrode 9, the semiconductor layer 18, the source electrode 21 and the drain electrode 24 constitute a thin film transistor Tr.

Next, a first passivation layer 30 is formed on the source and drain electrodes 21 and 24 and the active layer 18a exposed between the source and drain electrodes 21 and 24. Convex patterns 35 are formed on the first passivation layer 30 and a second passivation layer 37 covers the convex patterns 35 to have an uneven surface. The second passivation layer 37 has a drain contact hole 44 exposing the drain electrode 24 with the first passivation layer 30. The first passivation layer 30 is formed of an inorganic material and the second passivation layer 37 is formed of an organic material.

A reflector 41 is formed on the second passivation layer 37 by depositing a metal material that reflects light well. The reflector 41 also has an uneven surface due to the uneven second passivation layer 37. The reflector 41 is connected to the drain electrode 24 through the drain contact hole 44.

Meanwhile, in the transmissive area TmA, the gate insulating layer 15 and the first passivation layer 30 are sequentially formed on the substrate 3. The first passivation layer 30 is removed in the transmissive area TmA to expose the gate insulating layer 15 and to form a step between the transmissive area TmA and the reflective area RtA.

Next, a pixel electrode 49 is formed in the reflective area RtA and in the transmissive area TmA by depositing a transparent conductive material and then patterning it. The pixel electrode 49 contacts the reflector 41, and is electrically connected to the drain electrode 24.

FIGS. 2A to 2F show a manufacturing method of the array substrate for the transflective LCD device according to the related art.

Forming a switching element such as a thin film transister Tr, which includes a gate electrode, a semiconductor layer, a source electrode and a drain electrode, may use a conventional manufacturing method, and therefore, it will not be described in detail.

As shown in FIG. 2A, a first passivation layer 30 is formed on a source electrode 21 and a drain electrode 24 by depositing an inorganic material on an entire surface of a substrate 3 including a thin film transistor Tr as a switching element, wherein a reflective area RtA and a transmissive area TmA are defined on the substrate 3. The first passivation layer 30 improves adhesion between layers, but may be omitted. An organic layer 31 is formed on the first passivation layer 30 by coating a photosensitive organic material such as photo acryl.

Next, a mask 32 including light-blocking portions BA and light-transmitting portions TA is disposed over the organic layer 31 and a first mask process is performed. The organic layer 31 is exposed to light through the mask 32. Because the organic layer 31 is formed of the photosensitive organic material such as photo acryl, a process of forming a photoresist on the organic layer 31 can be omitted.

As shown in FIG. 2B, the exposed organic layer 31 is developed, and portions that are not exposed to light are removed to form organic patterns 33 in the reflective area RtA. At this time, an inclination angle of a convex pattern (to be formed later) may be changed by controlling a distance between the organic patterns 33. Here, the photosensitive organic material is a negative type, where a portion that is not exposed to light is removed. A photosensitive organic material of a positive type, where a portion that is exposed to light is removed, may also be used.

As shown in FIG. 2C, the substrate 3 including the organic patterns 33 of FIG. 2B is heat-treated, and thus convex patterns 35 are formed. Surfaces of the organic patterns 33 of FIG. 2B are melted through a heat-treatment process to spread out, and then is hardened resulting in the convex patterns 35.

As shown in FIG. 2D, a second passivation layer 37 is formed by coating the same organic material as the convex patterns 35 on an entire surface of the substrate 3 including the convex patterns 35. The second passivation layer 37 has an uneven surface, which has a proper inclination angle, due to the convex patterns 35 in the reflective area RtA and a flat surface in the transmissive area TmA.

Next, as shown in FIG. 2E, a second mask process is carried out and the second passivation layer 37 and the first passivation layer 30 are patterned. Thus, in the reflective area RtA, a drain contact hole 44 exposing the drain electrode 24 is formed, and in the transmissive area TmA, the second passivation layer 37 and the first passivation layer 30 are removed to form a step between the reflective area RtA and the transmissive area TmA.

A reflector 41 is formed on the second passivation layer 37 in the reflective area RtA by depositing a metal material that reflects light well and then patterning it. At this time, the reflector 41 also has an uneven surface due to the second passivation layer 37. The metal material is removed in the transmissive area TmA and thus there exists no reflector 41 in the transmissive area TmA. The reflector 41 contacts the drain electrode 24 through the drain contact hole 44 and functions as a reflective electrode.

As shown in FIG. 2F, a pixel electrode 49 is formed by depositing a transparent conductive material on the substrate 3 including the reflector 41 thereon and then patterning it. The pixel electrode 49 contacts the reflector 41 in the reflective area RtA and contacts a gate insulating layer 15 in the transmissive area TmA.

In the manufacturing method of the above array substrate, two mask processes are required for forming the uneven passivation layer. That is, the first mask process is performed for forming the convex patterns and the second mask process is carried out for forming the drain contact hole and the step between two areas in the second passivation.

The cost of materials may be increased because of twice coating an organic material. In addition, when the convex patterns are formed of a first organic layer and the second passivation layer is formed of a second organic layer over the convex patterns, the unevenness of the convex patterns may not be thoroughly reflected in the second passivation. Thus, the reflector may have a bad and uneven surface.

SUMMARY OF THE INVENTION

Accordingly, the present invention is directed to a manufacturing method of an array substrate for a liquid crystal display device that substantially obviates one or more of problems due to limitations and disadvantages of the related art.

An advantage of the present invention is to provide a manufacturing method of an array substrate for a transflective liquid crystal display device that reduces manufacturing costs and processes.

Another advantage of the present invention is to provide a manufacturing method of an array substrate for a transflective liquid crystal display device that has a reflector providing high reflectivity.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a manufacturing method of an array substrate for a liquid crystal display device includes forming a switching element in a pixel area on a substrate, wherein the pixel area includes a reflective area and a transmissive area, forming an organic layer on an entire surface of the substrate including the switching element, first exposing the organic layer using a first mask, second exposing the first exposed organic layer using a second mask, developing the first and second exposed organic layer to form a passivation layer having an unevenness pattern in the reflective area, forming a reflector on the passivation layer in the reflective area, and forming a pixel electrode on the reflector in the reflective area and the transmissive area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, an example of which is illustrated in the accompanying drawings.

FIGS. 3A to 3H are cross-sectional views illustrating a manufacturing method of an array substrate for a transflective LCD device according to the present invention. FIGS. 3A to 3G show a pixel area having a transmissive area TmA and a reflective area RtA, which includes a thin film transistor Tr.

Figure 1:
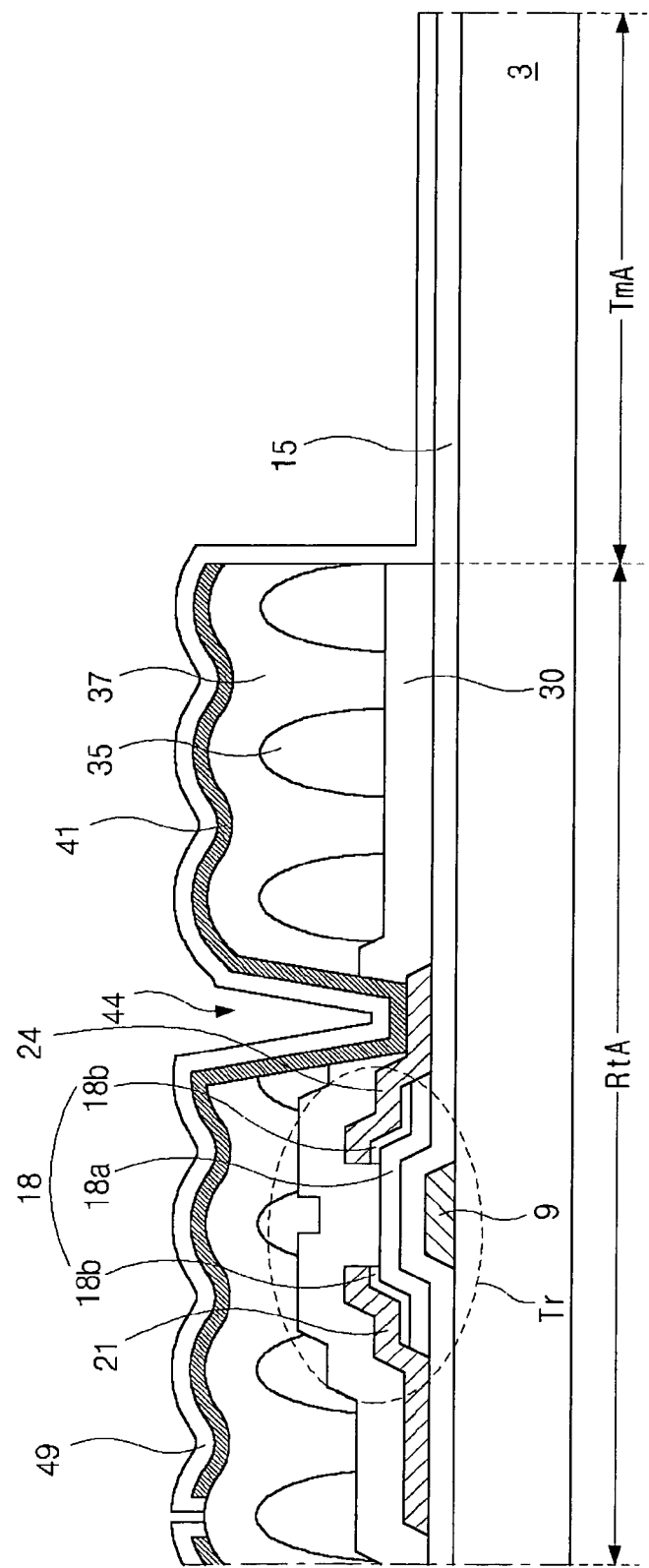
FIG. 1 is a cross-sectional view of an array substrate for a related art transflective LCD device.
Figure 2A:
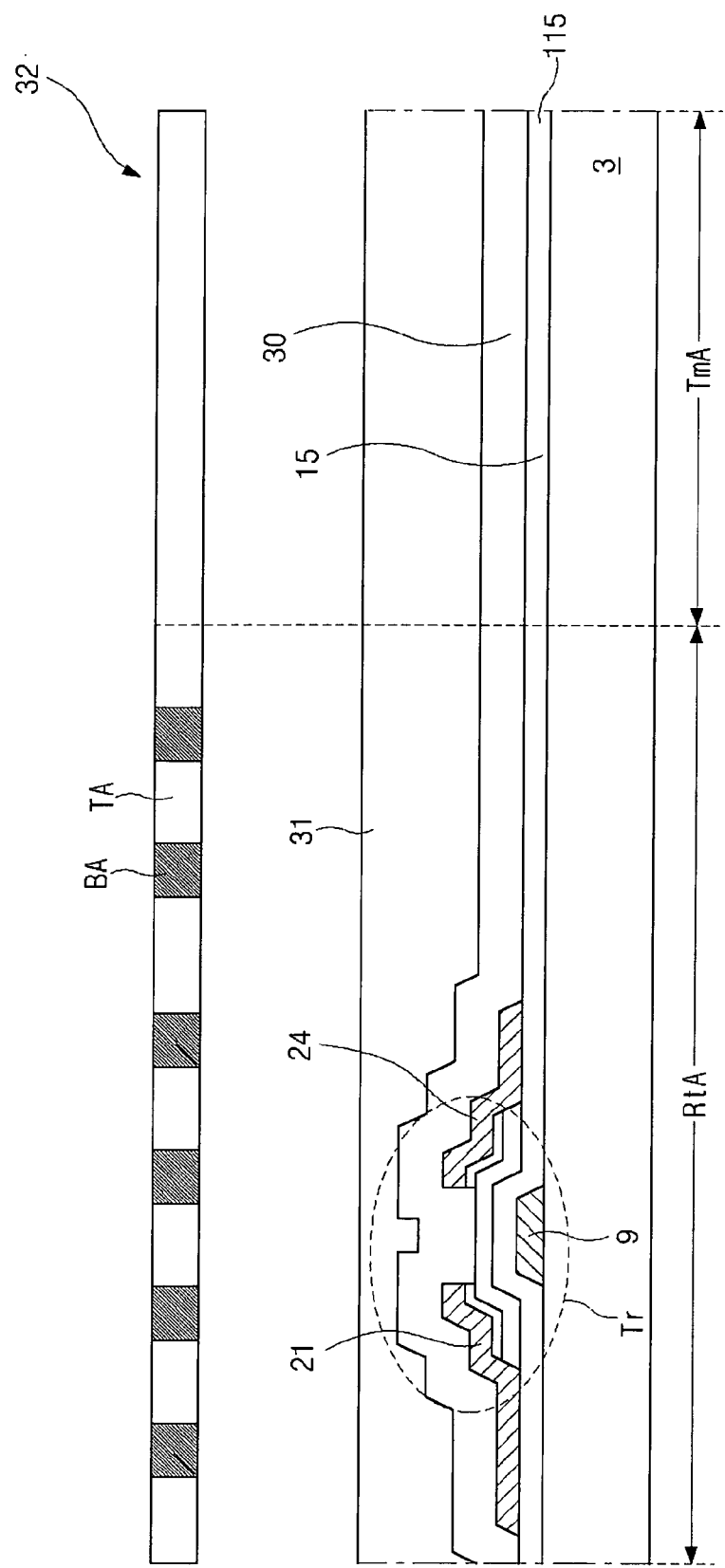
FIGS. 2A to 2F are cross-sectional views showing a manufacturing method of an array substrate for a transflective LCD device according to the related art.
Figure 2B:
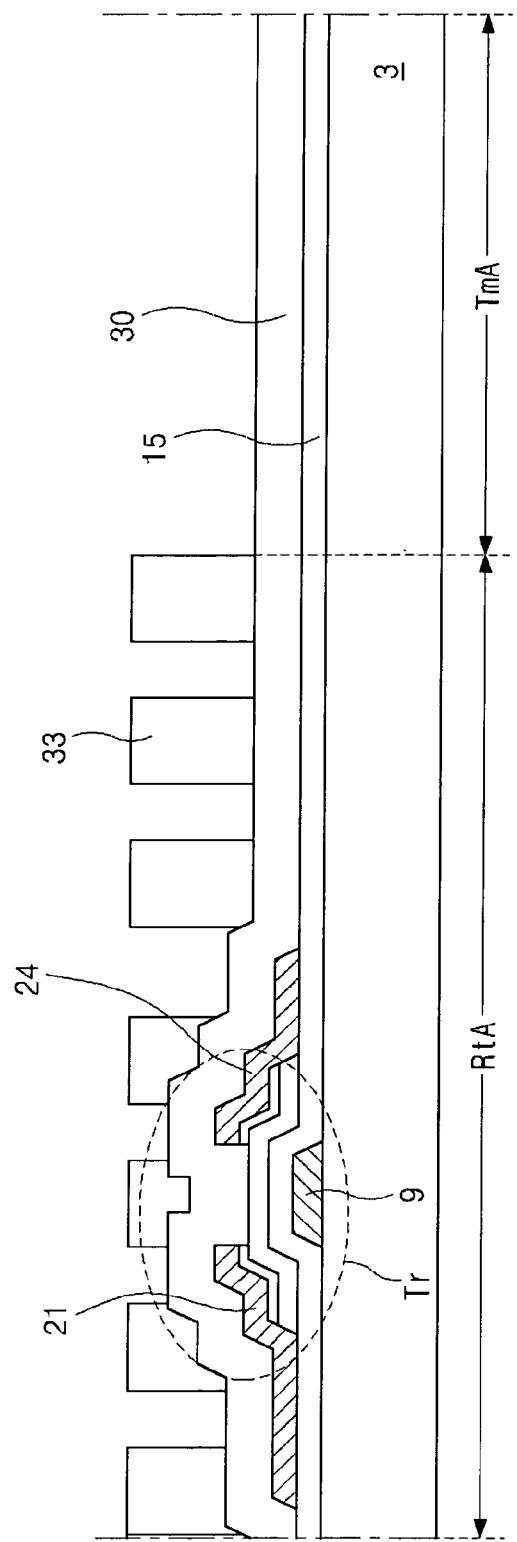
Figure 2C:
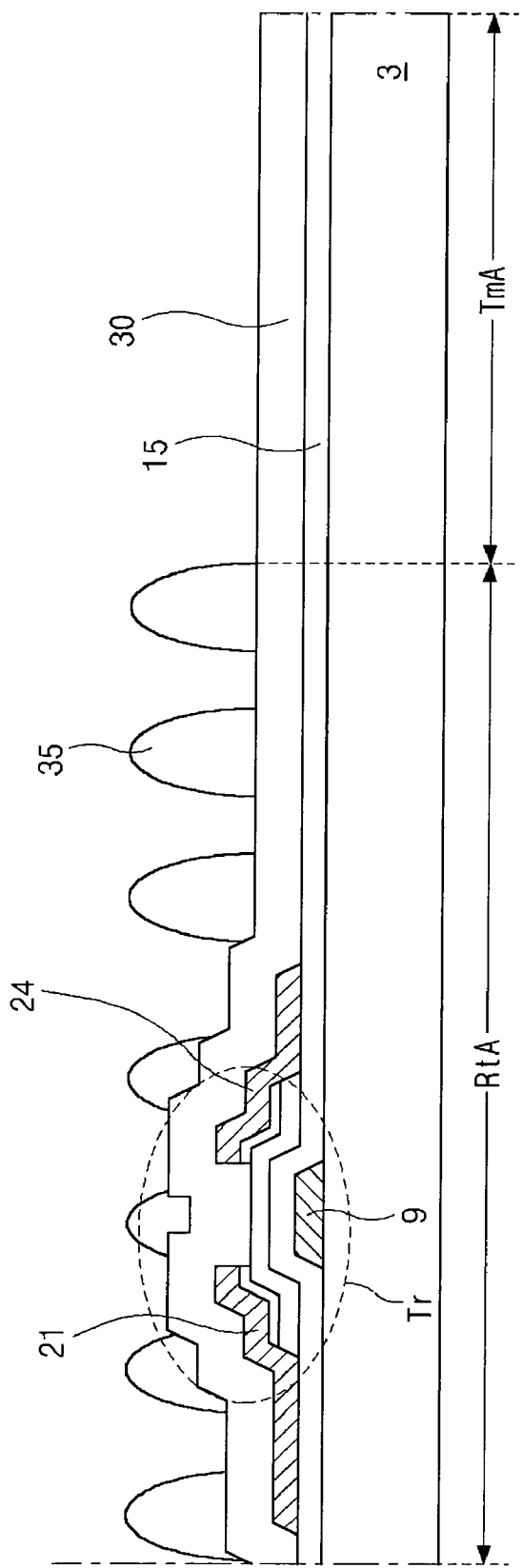
Figure 2D:
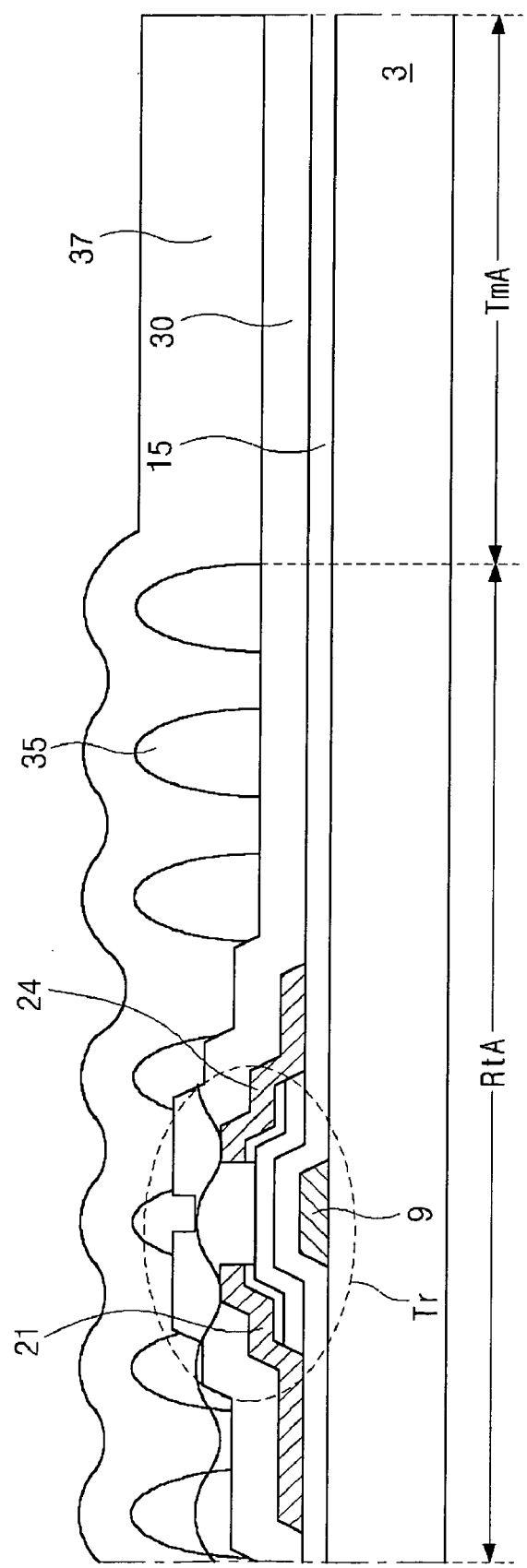
Figure 2E:
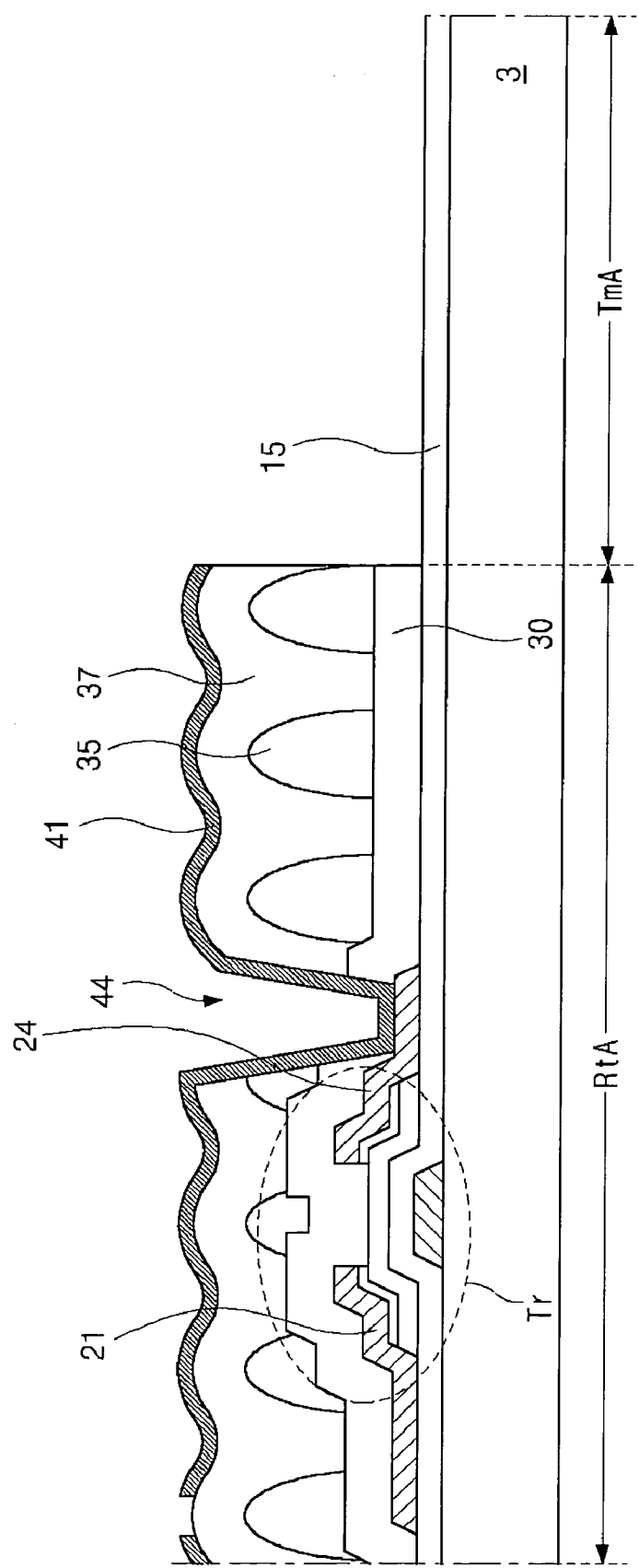
Figure 2F:
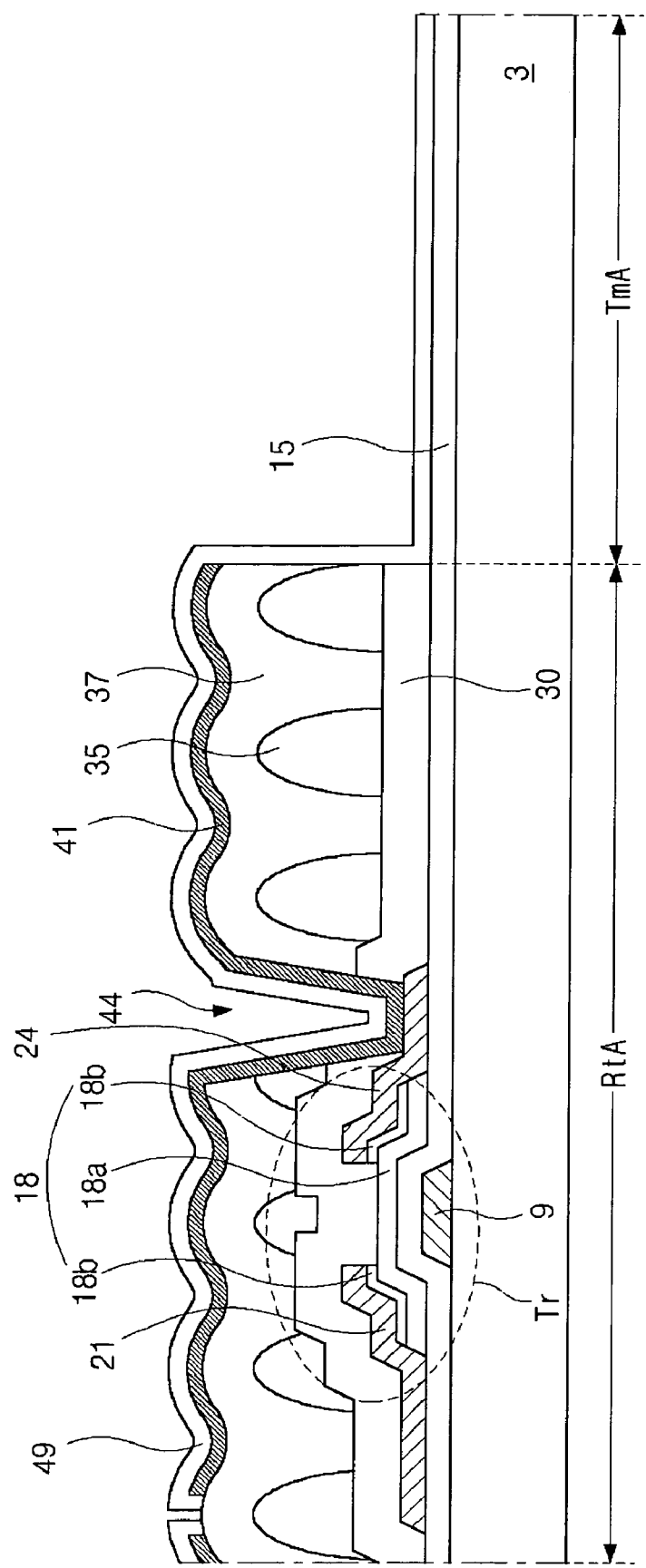
Figure 3A:
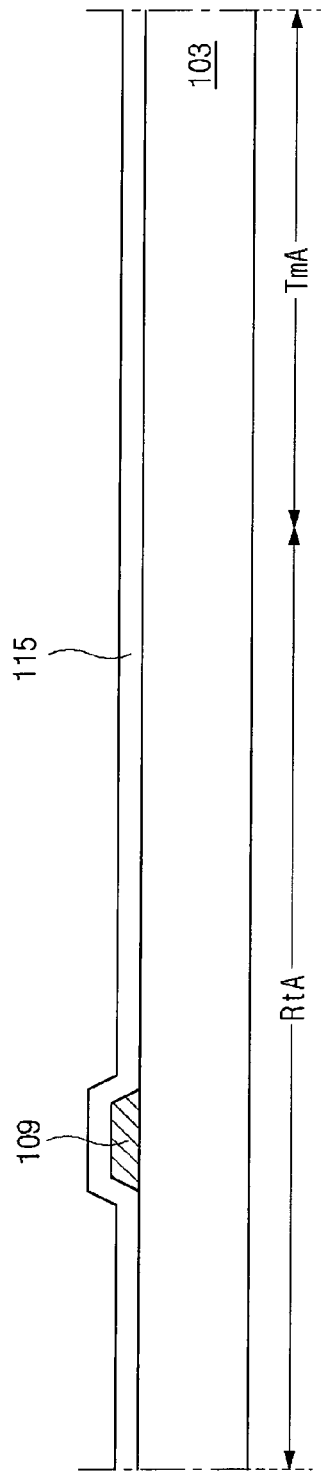
FIGS. 3A to 3H are cross-sectional views illustrating a manufacturing method of an array substrate for a transflective LCD device according to the present invention.

In FIG. 3A, a gate electrode 109 is formed on a substrate 103 by depositing a metal material and then patterning it. The gate electrode 109 is disposed in the reflective area RtA. Although not shown in the figure, a gate line connected to the gate electrode is also formed.

Next, a gate insulating layer 115 is formed on the gate electrode 109 and the gate line (not shown) by depositing an inorganic material such as silicon nitride ($SiN_x$) and silicon oxide ($SiO_2$) on an entire surface of the substrate 103.

Figure 3B:
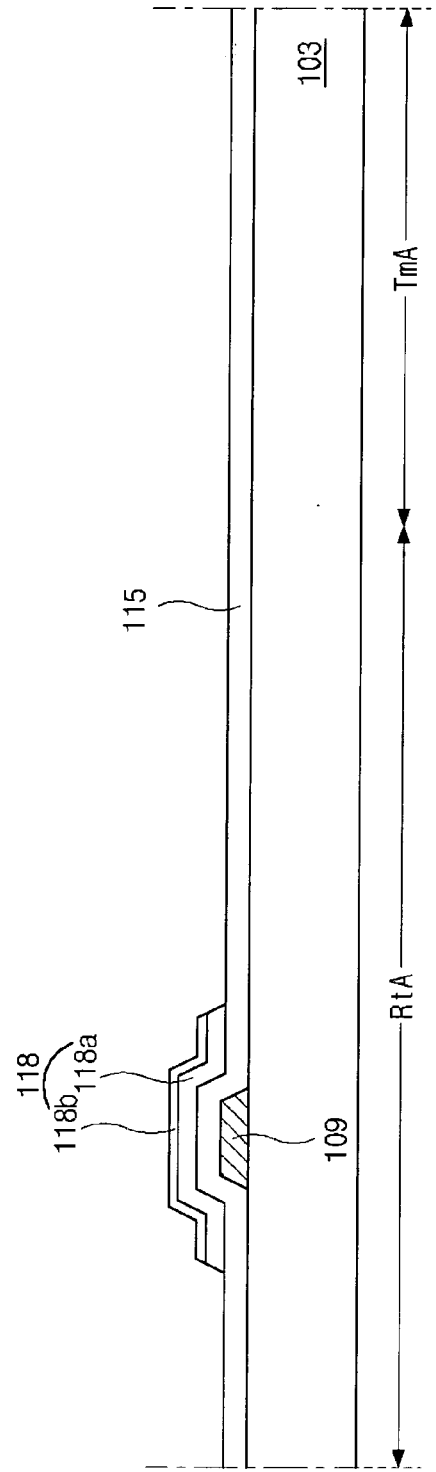

As shown in FIG. 3B, a semiconductor layer 118 is formed on the gate insulating layer 115 over the gate electrode 109 by sequentially depositing amorphous silicon and doped amorphous silicon and patterning them through a mask process, which includes photoresist-coating, exposing, developing and etching. The semiconductor layer 118 includes an amorphous silicon layer 118a and a doped amorphous silicon layer 118b.

Figure 3C:
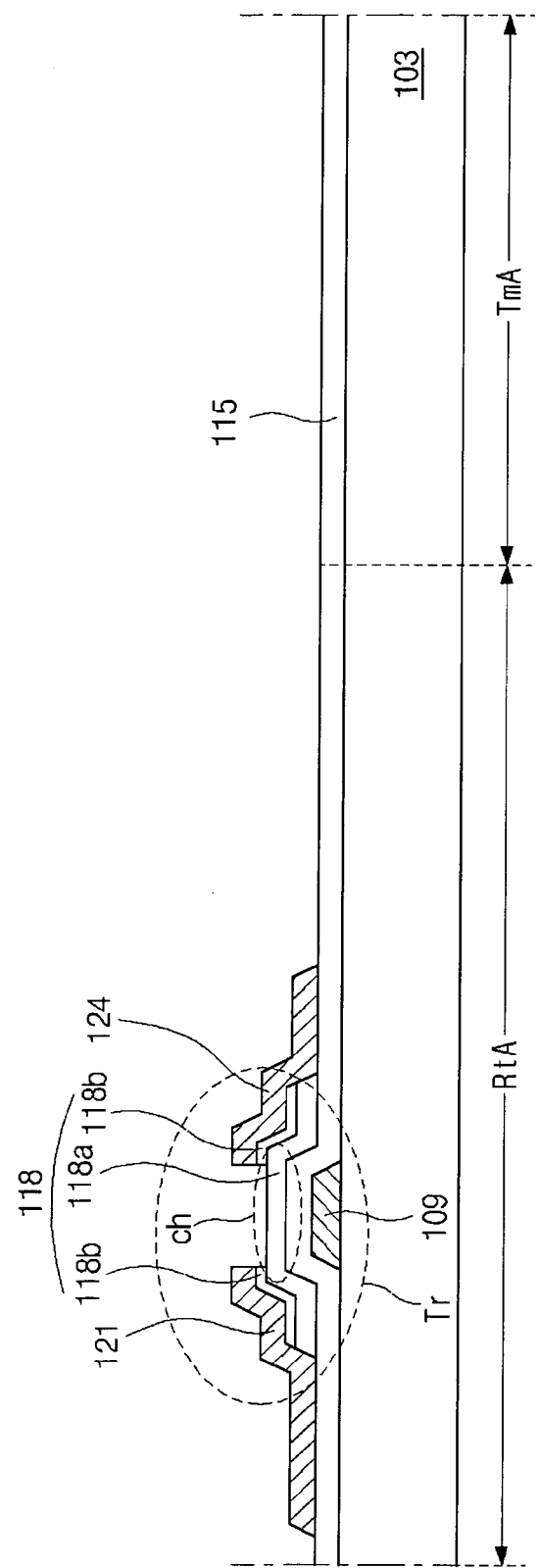

As shown in FIG. 3C, a source electrode 121 and a drain electrode 124 are formed on the semiconductor layer 118 by depositing a metal material on an entire surface of the substrate 103 including the semiconductor layer 118 and then patterning the metal material. Although not shown in the figure, a data line connected to the source electrode 121 is simultaneously formed. The source electrode 121 and the drain electrode 124 are spaced apart from each other over the semiconductor layer 118 corresponding to the gate electrode 109.

Next, the doped amorphous silicon layer 118b exposed between the source and drain electrodes 121 and 124 is removed to expose a portion of the amorphous silicon layer 118a. The amorphous silicon layer 118a functions as an active layer, and the doped amorphous silicon layer 118b, which contacts the source and drain electrodes 121 and 124, serves as an ohmic contact layer. The gate electrode 109, the semiconductor layer 118, the source electrode 121 and the drain electrode 124 constitute a thin film transistor Tr as a switching element. The exposed active layer 118a between the source and drain electrodes 121 and 124 becomes a channel ch of the thin film transistor Tr.

The thin film transistor Tr may have various shapes. For example, even though the thin film transistor Tr is shown having a bottom-gate structure using amorphous silicon, the thin film transistor Tr may have a top-gate structure using polycrystalline silicon.

In the top-gate structure thin film transistor, a buffer layer is formed on an entire surface of a substrate by depositing an inorganic insulating material. A polycrystalline silicon layer is formed by depositing an amorphous silicon layer on the buffer layer and crystallizing the amorphous silicon layer. Next, the polycrystalline silicon layer is patterned through a mask process including coating with photoresist, exposing, developing and etching steps to thereby form a semiconductor layer. A gate insulating layer is formed on the semiconductor layer by depositing an inorganic insulating material on an entire surface of the substrate including the semiconductor layer. A doping-blocking mask is disposed over the gate insulating layer, and a high dose n+ or p+ doping is performed on an entire surface of the substrate to form an active area that is not doped due to the doping-blocking mask and an ohmic contact area that is doped. Next, a gate electrode and a gate line are formed on the gate insulating layer, wherein the gate electrode corresponds to the active area. An inter insulating layer is formed on an entire surface of the substrate including the gate electrode and the gate line by depositing an inorganic insulating material and then is patterned through a mask process to form a semiconductor layer contact hole exposing the semiconductor layer. A metal material is deposited on an entire surface of the substrate including the inter insulating layer and then is patterned through a mask process to thereby form a data line, a source electrode and a drain electrode. Like this, a thin film transistor having the top-gate structure is formed.

Figure 3D:
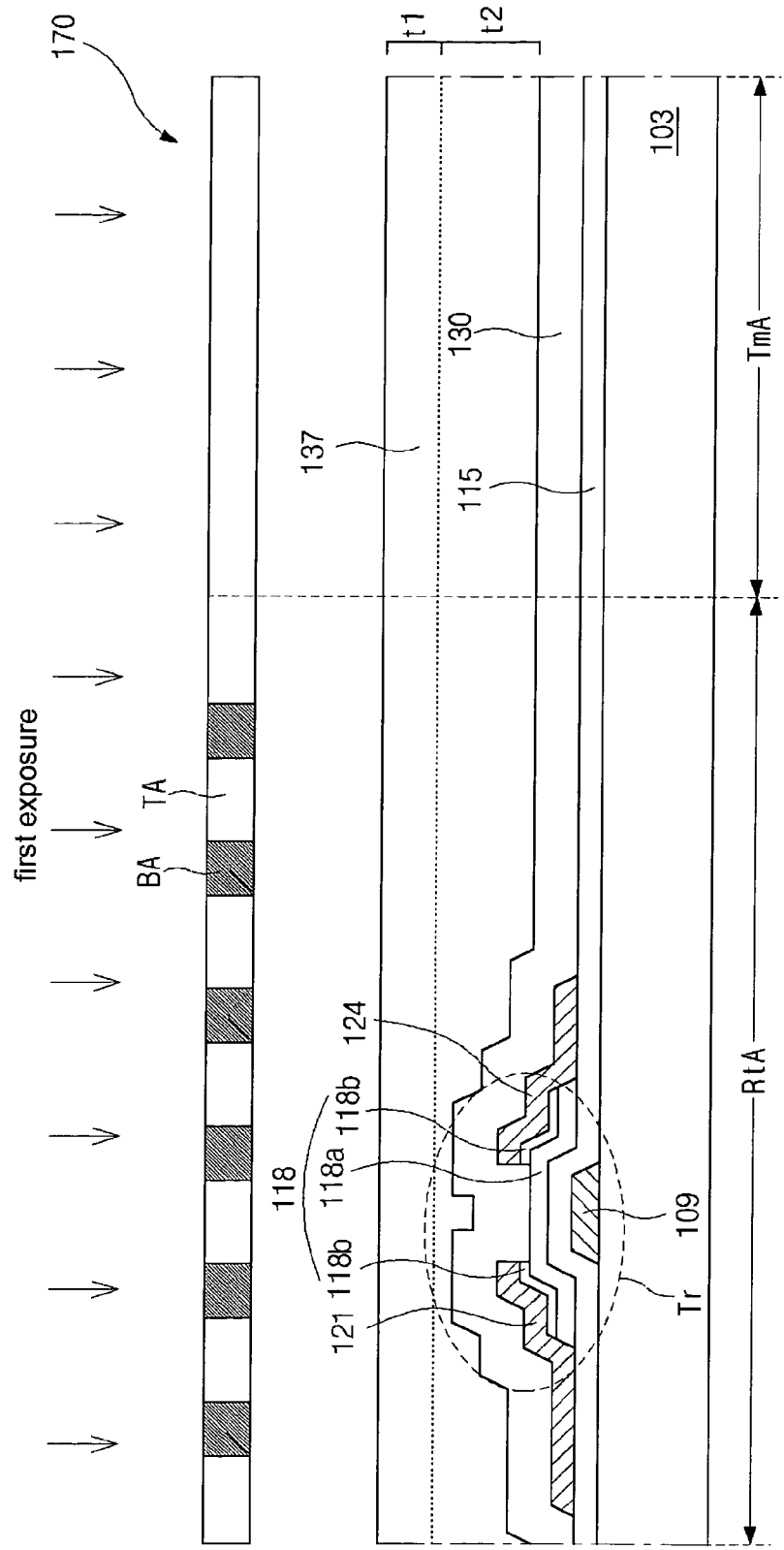

In FIG. 3D, an inorganic layer 130 is formed on the thin film transistor Tr by depositing an inorganic insulating material such as silicon nitride ($SiN_x$). The inorganic insulating material may be silicon oxide ($SiO_2$). The inorganic layer 130 may also be omitted. Next, an organic layer 137 having a predetermined thickness is formed on the inorganic layer 130 by coating a photosensitive organic material such as photo acryl on an entire surface of the substrate 103 including inorganic layer 130. The organic layer 137, beneficially, may have a thickness within a range of about 2.3 ㅁm to about 4 ㅁm. The organic layer 137 may be a positive type, wherein a portion that is exposed to light is removed or a negative type.

A first mask 170, which includes light-blocking portions BA and light-transmitting portions TA, is disposed over the organic layer 137, and then a first exposing process is performed. The first mask 170 is used for forming unevenness on the surface of the organic layer 137. In the first mask 170 corresponding to the reflective area RtA, the light-blocking portions BA and the light-transmitting portions TA alternates with each other, and in the first mask 170 corresponding to the transmissive area TmA, there exists only the light-transmitting portion TA that completely transmits light.

In general, an exposing process is carried out for about 2,000 ms (milliseconds) to about 2,500 ms, while the first exposing process is performed for about 600 ms to about 800 ms. Thus, a first portion corresponding to a first thickness t1 from an upper surface of the organic layer 137 is exposed to light. The first thickness t1 may be within a range of about 0.7 μm to about 1.2 μm. A second portion of the organic layer 137, which corresponds to a second thickness t2 except for the first portion of the organic layer 137, maintains the initial condition that is not exposed to light.

Figure 3E:
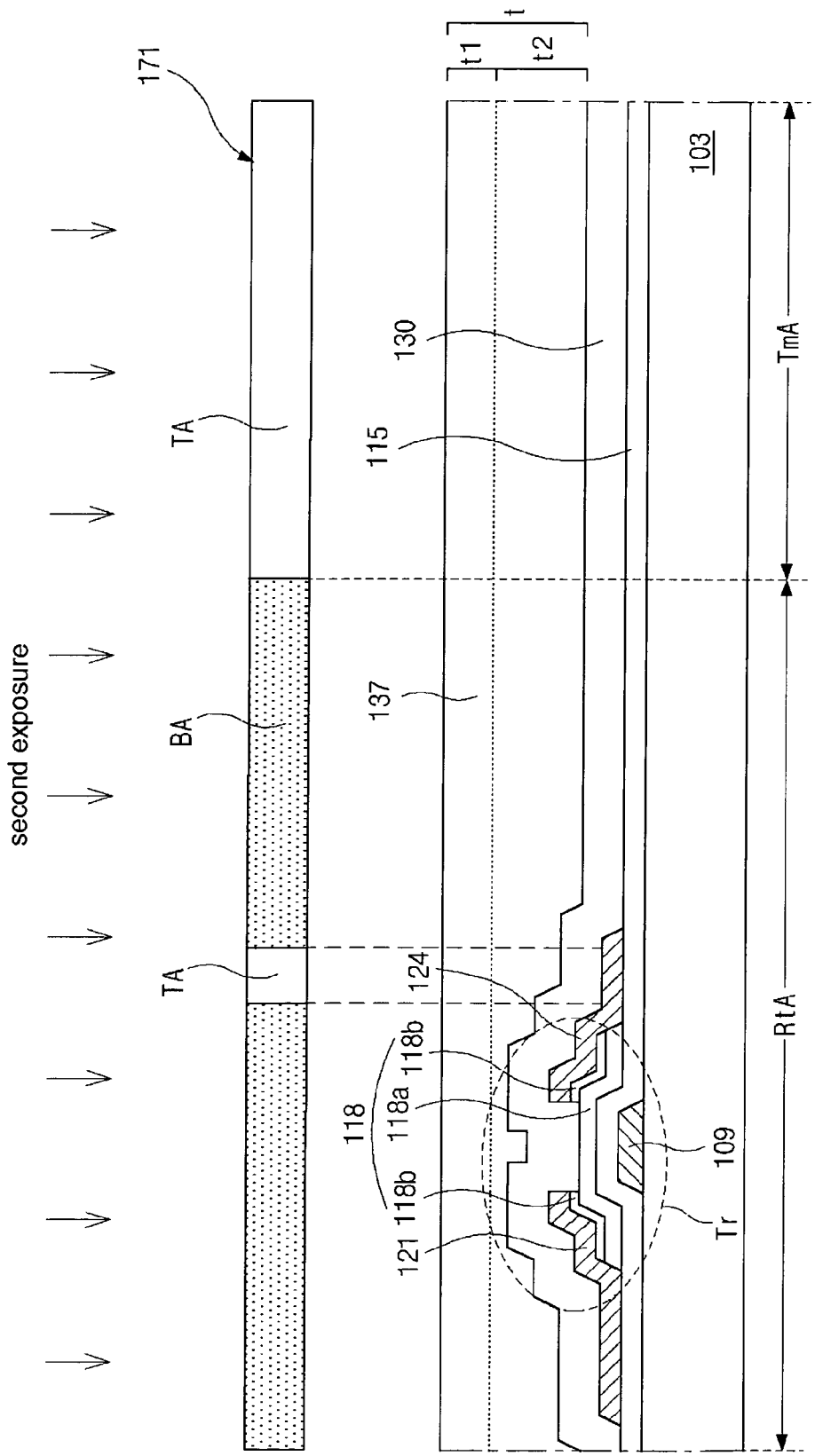

As shown in FIG. 3E, a second mask 171 is disposed over the first exposed organic layer 137 after taking away the first mask 170 of FIG. 3D, and then a second exposing process is carried out through the second mask 171. The second mask 171 is used for forming a transmissive hole and a drain contact hole in the organic layer 137. The second mask 171 may be changed within several seconds without additional waiting time because the second mask 171 is automatically changed in an exposing apparatus. The second mask 171 corresponding to the reflective area RtA has a light-transmitting portion TA corresponding to a part of the drain electrode 124, where a drain contact hole will be formed later, and light-blocking portions BA except for the light-transmitting portion TA. The second mask 171 corresponding to the transmissive area TmA has only a light-transmissive portion TA.

The second exposing process is performed for about 2,000 ms to about 2,500 ms, and thus all thickness t of the organic layer 137 is exposed to light.

Figure 3F:
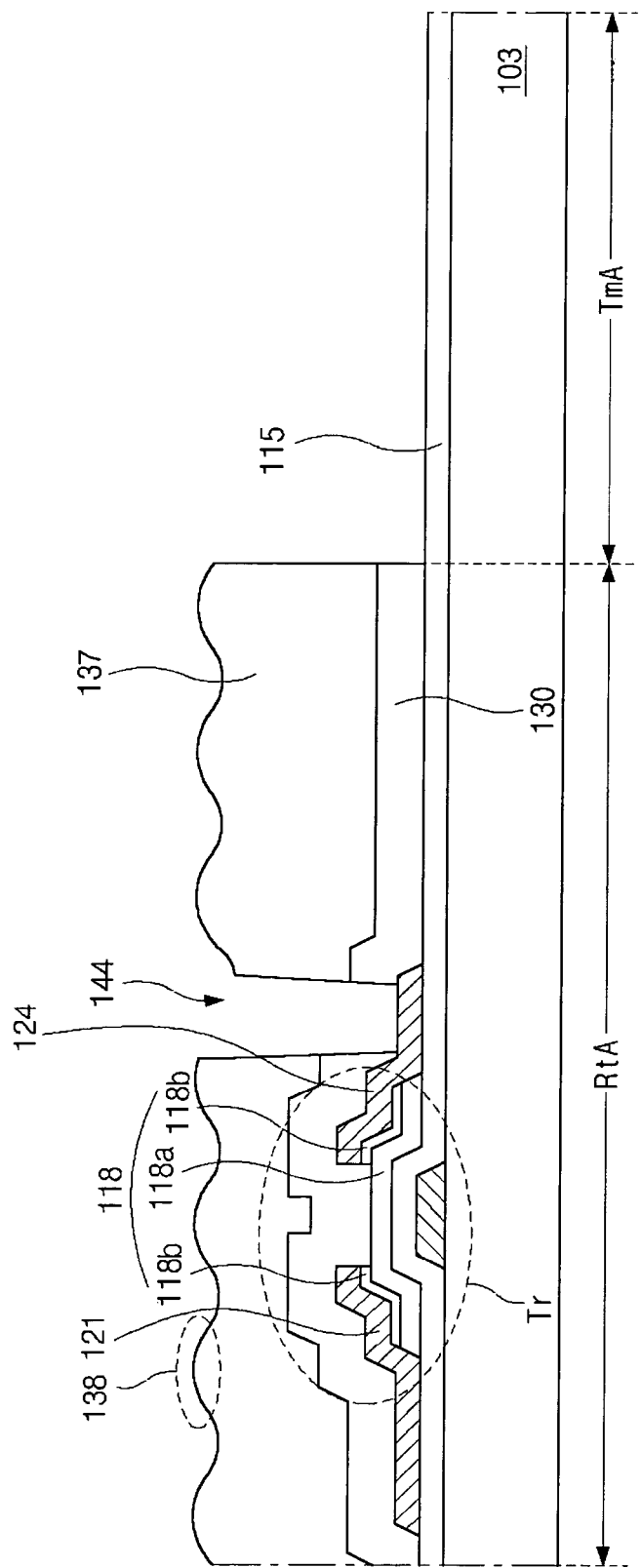

As shown in FIG. 3F, the first and second exposed organic layer 137 is developed. Then, in the reflective area RtA, an unevenness pattern 138 is formed on the surface of the organic layer 137 within the first thickness t1 of FIG. 3E, and in the transmissive area TmA, the organic layer 137 is completely removed to form a transmissive hole. Therefore, a step between the reflective area RtA and the transmissive area TmA is formed. Additionally, the inorganic layer 130 exposed by the organic layer 137 is etched to form a drain contact hole 144 exposing the part of the drain electrode 124 in the reflective area RtA and to expose the gate insulating layer 115 in the transmissive area TmA.

Next, the substrate 103 is heat-treated to smooth out the unevenness pattern 138 so that the unevenness gently undulates.

Figure 3G:
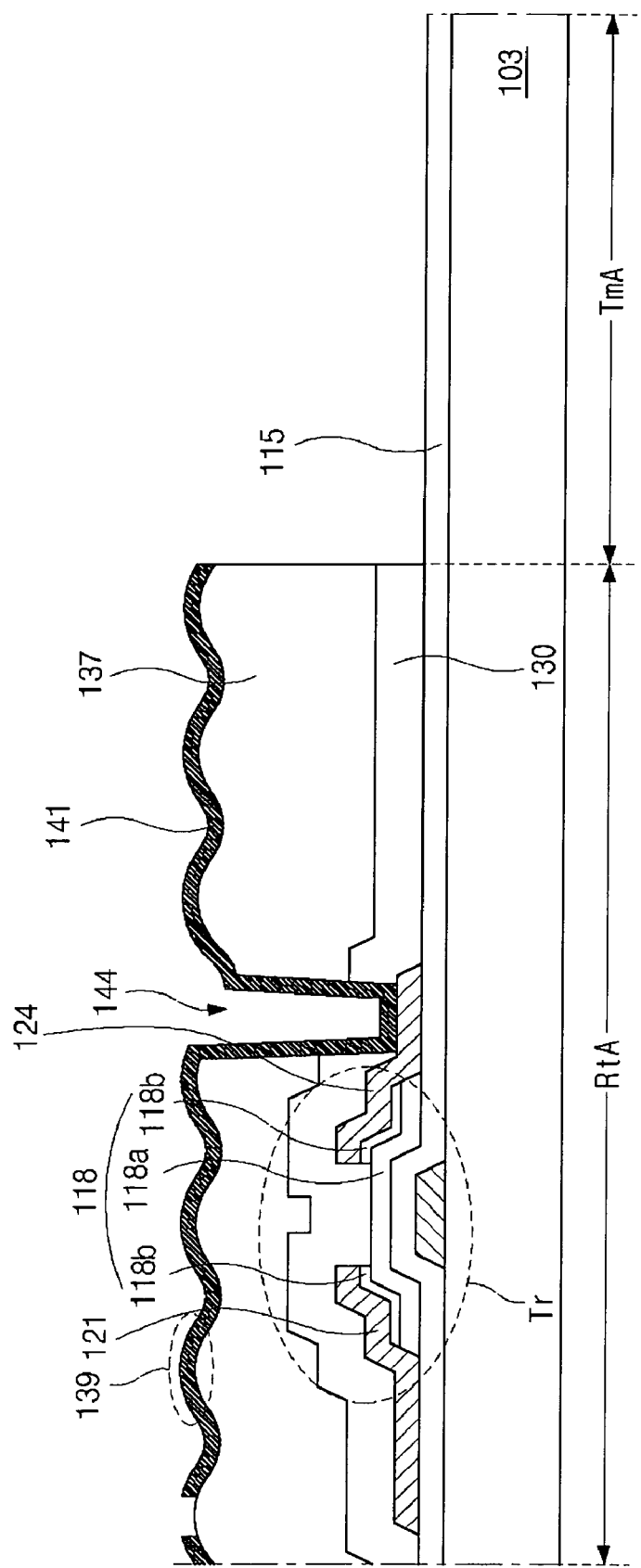

In FIG. 3G, a reflector 141 is formed on the organic layer 137 having the gently undulating unevenness pattern 138 in the reflective area RtA by depositing a metal material that reflects light well, such as aluminum (Al), aluminum alloy (AlNd) or argentum (Ag), and then removing the metal material corresponding to the transmissive area TmA through a mask process. At this time, the reflector 141 is connected to the drain electrode 124 through the drain contact hole 144, and thus functions as a reflective electrode. The reflector 141 also has an unevenness pattern 139 in its surface due to the organic layer 137 having the unevenness pattern 138 of FIG. 3E.

Figure 3H:
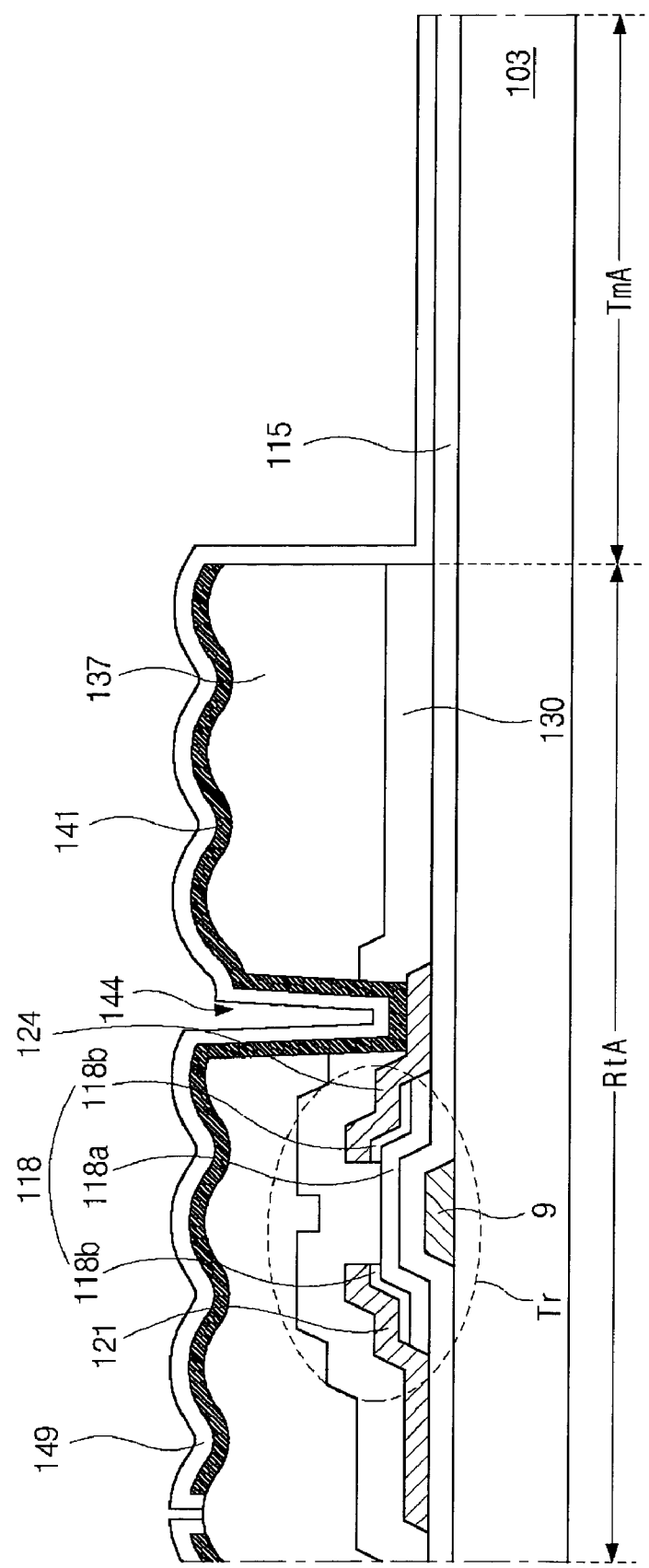

Next, as shown in FIG. 3H, a pixel electrode 149 is formed on the reflector 141 in the reflective area RtA and the gate insulating layer 115 in the transmissive area TmA by depositing a transparent conductive material on an entire surface of the substrate 103 including the reflector 141 and then patterning the transparent conductive material. The pixel electrode 149 contacts the reflector 141 to be electrically connected to the drain electrode 124. The pixel electrode 149 is formed of a transparent conductive material such as indium tin oxide (ITO) and indium zinc oxide (IZO).

In the present invention, the organic layer is patterned through two consecutive exposing processes, and thus the unevenness, the drain contact hole and the transmissive hole are formed. Additionally, the step between the reflective area and the transmissive area is formed. Thus, the cost of materials may be reduced and a good unevenness pattern can be formed. Moreover, the manufacturing process is simplified to thereby improve the efficiency of manufacturing the array substrate.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A manufacturing method of an array substrate for a liquid crystal display device, comprising:
    forming a switching element in a pixel area on a substrate, the pixel area including a reflective area and a transmissive area;
    forming an organic layer on an entire surface of the substrate including the switching element;
    first exposing the organic layer using a first mask;
    second exposing the first exposed organic layer using a second mask;
    developing the first and second exposed organic layer to form a passivation layer having an unevenness pattern in the reflective area and a contact hole exposing a drain electrode of the switching element;
    forming a reflector on the passivation layer in the reflective area, wherein the reflector is connected to the drain electrode through the contact hole; and
    forming a pixel electrode on the reflector in the reflective area and the transmissive area.

2. The method according to claim 1, wherein the organic layer includes a photosensitive material.

3. The method according to claim 2, wherein the photosensitive material includes photo acryl.

4. The method according to claim 3, wherein the photo acryl is a positive type photosensitive material.

5. The method according to claim 1, wherein the first mask includes a first portion corresponding to the reflective area having alternating light-blocking portions and light-transmitting portions and a second portion corresponding to the transmissive area having a light-transmitting portion.

6. The method according to claim 1, wherein time for first exposing the organic layer is about 600 ms to about 800 ms.

7. A manufacturing method of an array substrate for a liquid crystal display device, comprising:
    forming a switching element in a pixel area on a substrate, the pixel area including a reflective area and a transmissive area;
    forming an organic layer on an entire surface of the substrate, including the switching element;
    first exposing the organic layer using a first mask;
    second exposing the first exposed organic layer using a second mask;
    developing the first and second exposed organic layer to form a passivation layer having an unevenness pattern in the reflective area;
    forming a reflector on the passivation layer in the reflective area; and
    forming a pixel electrode on the reflector in the reflective area and the transmissive area,
    wherein time for first exposing the organic layer is about 600 ms to about 800 ms, and
    wherein a first thickness from an upper surface of the organic is exposed to light during first exposing the organic layer.

8. The method according to claim 7, wherein the first thickness is within a range of about 0.7 µm to about 1.2 µm.

9. The method according to claim 1, wherein the second mask includes light-transmitting portions and light-blocking portions, the light-transmitting portions corresponding to a drain electrode of the switching element and the transmissive area.

10. The method according to claim 1, wherein time for the second exposing of the organic layer is about 2,000 ms to about 2,500 ms.

11. The method according to claim 1, wherein the organic layer has a total thickness within a range of about 2.3 μm to about 4 μm.

12. The method according to claim 1, further including forming an inorganic layer between forming the switching element and forming the organic layer.

13. The method according to claim 1, wherein the reflector includes one of aluminum, aluminum alloy and argentum.

14. The method according to claim 1, wherein the pixel electrode directly contacts the reflector.

15. The method according to claim 1, wherein forming the switching element includes:
   forming a gate electrode on the substrate;
   forming a gate insulating layer on the gate electrode;
   forming an amorphous silicon layer and a doped amorphous silicon layer on the gate insulating layer;
   forming source and drain electrodes on the doped amorphous silicon layer, the source and drain electrodes spaced apart from and facing each other; and
   removing the doped amorphous silicon exposed between the source and drain electrodes.

16. The method according to claim 1, wherein forming the switching element includes:
   forming a semiconductor layer on the substrate;
   forming a gate insulating layer on the semiconductor layer;
   forming a gate electrode on the gate insulating layer;
   forming an inter insulting layer on the gate electrode, the inter insulating layer exposing parts of the semiconductor layer; and
   forming source and drain electrodes on the inter insulating layer, the source and drain electrodes connected to the exposed parts of the semiconductor layer.

17. The method according to claim 16, wherein the semiconductor layer includes polycrystalline.

18. The method according to claim 1, wherein the reflector has an uneven surface due to the unevenness surface of the passivation layer.

19. The method according to claim 1, wherein the pixel electrode includes one of indium tin oxide (ITO) and indium zinc oxide (IZO).

* * * * *